ived Jan. 17, 1961

2,968,676

PREPARATION OF DPA OVER FLUORIDE IMPREGNATED CATALYST

Allen G. Potter, Jr., Somerville, and Robert G. Weyker, North Plainfield, N.J., assignors to American Cyanamid Company, New York, N.Y., a corporation of Maine No Drawing. Filed Oct. 6, 1958, Ser. No. 765,328

3 Claims. (Cl. 260—576)

This invention relates to an improved process for the conversion of aniline to diphenylamine. More specifically, it relates to a process for the conversion of aniline to diphenylamine which is improved in that it uses as the catalyst an activated alumina which has been impregnated by a water soluble fluoride.

Diphenylamine is produced commercially by a process which involves the catalytic reaction in the vapor phase of aniline to form diphenylamine and ammonia. This reaction is carried out by passing the vapors of aniline over a catalyst usually activated alumina at a high temperature. The effluent vapors are condensed and fractionated and the fractions obtained consist of unreacted aniline, diphenylamine and various volatile and non-volatile by-products. The aniline is recycled and the by-products are discarded. Some of the by-products, namely the solid ones, are left on the catalyst as a coke which must be periodically removed by a regeneration process.

Processes such as these are described in detail in U.S. 2,099,039, and in British Patent 752,859 and Australian Patent 200,820, both of which correspond to the application for U.S. Letters Patent to Gilbert I. Addis, Ser. No. 611,814, filed September 21, 1956, and copending herewith. In this patent and patent application, are to be found the details of temperatures, times and feed rates which are usable. Since the conversion of aniline to diphenylamine is quite low for any single pass, it is absolutely necessary to recycle the unreacted aniline in this process. As is true of any recycling process, the by-product reactants tend to build up and the effect of by-product reaction is magnified by recycling. Any loss by by-reaction means so much less starting material which may, on future passes, become converted to desired product and thus with each subsequent pass the yield of desired product is reduced by just that much. In addition of course, on each subsequent pass there is further loss by by-reaction.

We have found that the process of preparing diphenylamine commercially from aniline by a vapor phase reaction over activated alumina, is greatly improved by using as the catalyst activated alumina which has first been impregnated with a water soluble fluoride and then dried. The process used is preferably the vapor phase reaction of aniline over a fixed bed of alumina at 480° C. and about 100 lbs. p.s.i. of pressure as described in the copending application of Addis referred to above, but in a broader sense it can be any conversion of aniline to diphenylamine over activated alumina as described in either the Addis application or the Hill patent referred to above.

It is an advantage of our invention that the by-reactions are greatly decreased by the use of this fluoride impregnated alumina. Consequently, there is less coke upon the catalyst and therefore more passes can be made before regeneration is needed. Also, the lower amount of coking leaves more catalytic area active for diphenylamine production. Further, the over-all conversion of aniline to diphenylamine is greatly increased by the large decrease in the amount of by-reaction and consequently the large increase in the amount of aniline which, even though it has not yet become diphenylamine, can be recycled to make diphenylamine. It is a still further advantage of our invention that this great improvement in the commercial production of diphenylamine is achieved by a very simple treatment of the catalyst as described below and thus adds little to the cost of the process.

The process of our invention is carried out over a catalyst which is prepared by a simple impregnation with a water soluble fluoride. Thus, an activated alumina catalyst is impregnated by merely immersing in a solution of a water soluble fluoride, separating the solid impregnated alumina from the solution and drying at about 90° C. without washing. The alumina used may be any activated alumina catalyst such as are normally used for the production of diphenylamine. Such catalysts are described in the Addis application and in the Hill patent. One catalyst which has been found to be particularly suitable is an alumina obtained commercially which is a sprayed-dried alumina gel catalyst which has subsequently been agglomerated into balls and calcined. This catalyst contains about 6% silica, the remainder being alumina.

The fluoride solution which is used to impregnate the alumina is preferably a dilute solution. Dilute solutions varying from about 0.5% to about 10% in concentration of the water soluble fluoride may be used. A concentration of 2% by weight is found to be most preferable. The water soluble fluoride may be any water soluble fluoride such as alkali metal fluorides (for example sodium, potassium, lithium, caesium fluorides), ammonium fluoride or hydrogen fluoride. Ammonium fluoride is preferred. When an alumina catalyst is impregnated in this manner with a 2% solution of ammonium fluoride, it appears that less than 1% of the catalyst thus formed is fluoride ion. It is not known in what form the fluoride enters the alumina catalyst. It may be in the latices in the alumina crystal or it may be absorbed thereon. We have not been able to determine this and we therefore do not wish to be limited to any theory thereon.

Our invention can be illustrated by the following examples in which parts are by weight unless otherwise indicated.

*Example 1*

A spray-dried alumina gel catalyst which has been balled and calcined is stirred into a 2% aqueous solution of ammonium fluoride. The slurry is allowed to stand at room temperature for about 1 hour, after which the solution is removed by decantation. The residual catalyst is dried at 90° C. without washing. This catalyst is used in the various conversions of aniline to diphenylamine shown in the other examples.

*Example 2*

The catalyst prepared in Example 1 is charged into a vertical tube reactor and calcined at 480° C. with air. The reactor is then charged with nitrogen, pressurized and exposed to a flow of aniline vapor at 480° C. at 100 p.s.i. The effluent product is condensed and fractionated, following a conversion cycle, the bed is regenerated with air, recalcined at 480° C. and the process is repeated as specified.

Using this procedure, 4 hour conversions were carried out over 250 parts by volume of impregnated and unimpregnated alumina respectively, at 480° C. 100 lbs. p.s.i. and a feed rate of 4.5 g. of aniline per hour per cc. of catalyst. The procedure resulted in a conversion over the unimpregnated catalyst to give 10.5 g. of diphenylamine per 100 g. of effluent, while over the treated catalyst of Example 1, the conversion was 13 to 14 g. of diphenylamine per 100 g. of effluent.

Example 3

The procedure of Example 2 is followed, except that conversions were carried out for 24 hours instead of 4 hours. The unimpregnated catalyst gave a conversion of 7.0 parts of diphenylamine per 100 parts of product and 2.2 to 2.8 parts of coke calculated as parts of aniline per 100 parts of diphenylamine. The impregnated catalyst of Example 1 gave a conversion of 8.5 parts of diphenylamine per 100 parts of effluent and 0.78 to 1.05 parts of coke calculated as parts of aniline per 100 parts of diphenylamine.

Example 4

The procedure of Example 2 is followed using charges of 40 parts by volume of impregnated and unimpregnated alumina, atmospheric pressure instead of the elevated pressure, and a feed rate of 1 part of aniline per hour per part by volume of catalyst. The catalysts used were respectively an unimpregnated alumina, and 3 samples impregnated by the process of Example 1, except that the concentration of the ammonium fluoride in the impregnating solution was varied. The specific impregnated catalysts were those impregnated with 0.5% ammonium fluoride solution, those impregnated with 2% ammonium fluoride solution and those impregnated with 4% ammonium fluoride solution. The conversions obtained are as follows:

Catalyst (alumina): Conversion gms. DPA/100 gms. product
- Unimpregnated _____ 15–16
- Impregnated 0.5% $NH_4F$ _____ 18.1
- Impregnated 2% $NH_4F$ _____ 19–22
- Impregnated 4% $NH_4F$ _____ 20.3–22.1

When the catalyst impregnated with the 2% ammonium fluoride solution is subjected to 80 cycles of conversion and regeneration, no loss in its high activity is observed.

Example 5

The procedure of Example 2 is followed using 24 hours passage of aniline over the catalyst and the effluent product is carefully fractionated to study impurity formation. The resulting analysis of the effluent for unimpregnated alumina and for the alumina of Example 1 as follows:

| Constituent | Untreated Alumina | Impregnated Alumina |
|---|---|---|
| Aniline | 91.56 | 90.9 |
| Diphenylamine | 7.46 | 8.8 |
| Volatile by-products | 0.24 | 0.1 |
| Non-volatile by-products | 0.74 | 0.2 |

We claim:
1. In a process for the manufacture of diphenylamine from aniline wherein aniline vapor under superatmospheric pressure is contacted with an alumina catalyst at a temperature above 400° C., whereby an effluent vapor mixture, containing product diphenylamine is obtained; the improvement which comprises using as said catalyst an activated alumina prepared by a process which comprises contacting said alumina in particulate form with an aqueous solution containing a concentration of from about 0.5 to about 10 weight percent of a water soluble inorganic fluoride, separating so-treated particulate alumina from residual aqueous solution and drying the so-separated impregnated particles, said fluoride being selected from the group consisting of the alkali metal, ammonium and hydrogen fluorides.

2. The process of claim 1 in which said water soluble fluoride is ammonium fluoride.

3. The process of claim 2 in which the concentration of ammonium fluoride in said aqueous solution is about 2% by weight.

References Cited in the file of this patent

UNITED STATES PATENTS

| | | |
|---|---|---|
| 1,314,538 | Rogers | Sept. 2, 1919 |
| 1,392,942 | Houlehan | Oct. 11, 1921 |
| 2,098,039 | Hill et al. | Nov. 2, 1937 |
| 2,625,570 | Pines et al. | Jan. 13, 1953 |
| 2,689,226 | Hoekstra | Sept. 14, 1954 |

FOREIGN PATENTS

| | | |
|---|---|---|
| 752,859 | Great Britain | July 18, 1956 |
| 200,820 | Australia | Jan. 6, 1955 |

OTHER REFERENCES

Berg et al.: Chemical Engineering Progress, volume 47, pages 469–472 (1951).